Feb. 26, 1935.                C. GIANINI                1,992,864
                    RADIAL INTERNAL COMBUSTION ENGINE
                         Filed March 16, 1934
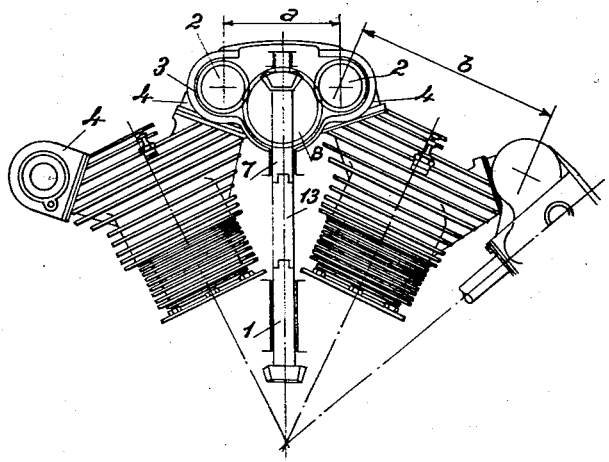
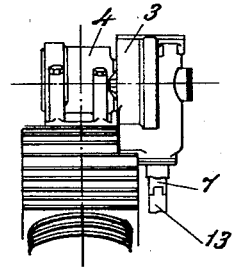
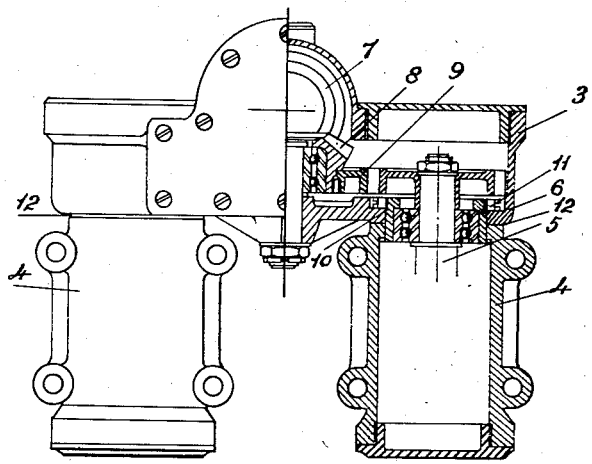
C. Gianini
INVENTORS
By Marks & Clark
ATTYS.

Patented Feb. 26, 1935

1,992,864

UNITED STATES PATENT OFFICE 1,992,864

RADIAL INTERNAL COMBUSTION ENGINE

Carlo Gianini, Rome, Italy, assignor to Compagnia Nazionale Aeronautica, Rome, Italy Application March 16, 1934, Serial No. 715,988
In Italy March 21, 1933

1 Claim. (Cl. 123—90)

This invention relates to radial internal combustion engines having a considerable number of cylinders.

One of the features of internal combustion engines of this type is that the inlet and exhaust valves are of very large diameter. The diameter of the valves can be made greatest when the cylinder head is hemispherical and the valves are arranged at an angle of 90° to one another. This arrangement has the disadvantage, however, that the ends of the valve rods are very far apart. This disadvantage leads to trouble particularly when the valves are directly controlled by means of cam shafts acting directly on the suitably shaped valve stems. One other hand, it is the direct control of the valves which, in the case of engines of the aforesaid kind, is preferable to other forms of control, for example levers and push rods, because the reciprocating masses are thereby reduced to a minimum. The great distance apart of the valves results, however, in the two cam shafts of the one cylinder being widely separated.

Now the present invention is based on the observation that, in the case of radial engines having a large number of cylinders, for example seven, nine or more, the axial distance between the cam shafts of the same cylinder is greater than the axial distance between the cam shafts of two adjacent cylinders. The normal arrangement for controlling the cam shaft is, therefore, altered and, in accordance with the invention, the radial driving or controlling spindles are arranged to control the adjacent cam shafts of each pair of adjacent cylinders instead of each controlling the two cam shafts of the same cylinder as heretofore.

A constructional embodiment of the invention is illustrated by way of example in the accompanying drawing, in which:—

Figure 1 is a front elevation of the controlling mechanism at right angles to the plane of the cylinders;

Figure 2 is a side elevation of the controlling mechanism parallel to the plane of the cylinders, and Figure 3 illustrates on a larger scale on the left-hand side a plan of the controlling device parallel to the driving spindle and on the right-hand side a horizontal section taken through the plane of the cam shaft.

Referring to the drawing, the radial spindle 1 drives the cam shafts of two adjacent cylinders by means of the bevel gearing 7, 8 and the pinion 9 which meshes with a pinion 2 on each of the cam shafts. This has the advantage that, owing to the smaller distance $a$ (Figure 1) between the axes of the cam shafts of adjacent cylinders, as compared with the axial distance $b$ between the two cam shafts of the same cylinder, the entire mechanism and its casing 3 may be smaller and, therefore, lighter.

The driving mechanism in accordance with the invention does not cover the cylinder in any way, but allows the cylinder and cylinder head to be thoroughly cooled. As compared therewith a driving gear which controls the two cam shafts of the same cylinder always interferes with the cooling of the cylinder head of the cylinder in question. In order to enable the cylinders to expand when the engine is running, the casing 3 which encloses the driving mechanism is not rigidly connected with the cylinder heads but is connected with two smaller casings 4 which contain the cam shafts 5 (Figure 3) in such a manner that relative movement is possible.

In the form of construction illustrated in the drawing, the casing 3 which encloses the bevel wheels 7 and 8 and the pinion 9 (Figures 1 and 3) is provided in the rear with two circular openings. The smaller casings 4 which enclose the cam shafts are rigidly fixed to the cylinder heads and are provided in front with two reduced connecting pieces 6, which are screwed in and project beyond the casings 4, on which the openings 10 of the casings 3 are placed, the surface 12 forming the bearing or supporting surface. A nut 11 which is not very tightly screwed up holds the casing 3 against the casings 4 of two adjacent cylinders. This form of fastening, however, also acts as a joint and allows the cylinders to move if expansion occurs. The short shaft of the bevel wheel 7 is connected by means of a universal joint 13 or the like (Figure 1) with the radial driving spindle 1 and can thus follow any small movements which the casing 3, and therefore the shaft of the wheel 7, may make in consequence of the expansion of the cylinders. On the other hand, the dimensions of the entire system, namely the casing 3, the steel cylinders, the aluminium cylinder heads, the casing 4, are so proportioned that the variations in the axial distance $a$ due to the expansion of the cylinders are limited to quite a small amount.

This proportioning of the dimensions is effected by taking into account the different coefficients of expansion of the steel cylinder and the aluminium cylinder head and by taking into account also the different temperatures of these parts when the engine is running.

What I claim is:

Valve controlling mechanism for radial internal combustion engines having a considerable number of cylinders the valves of which are actuated by cams mounted on cam shafts, wherein each controlling valve mechanism comprises a radial driving shaft and a gearing from the said shaft to the cam shafts of two adjacent valves of two adjacent cylinders, the gearing and the cam shafts being enclosed in casings so articulated the one to the other that relative movement between the casings is impossible.

CARLO GIANINI.